Figure 1:
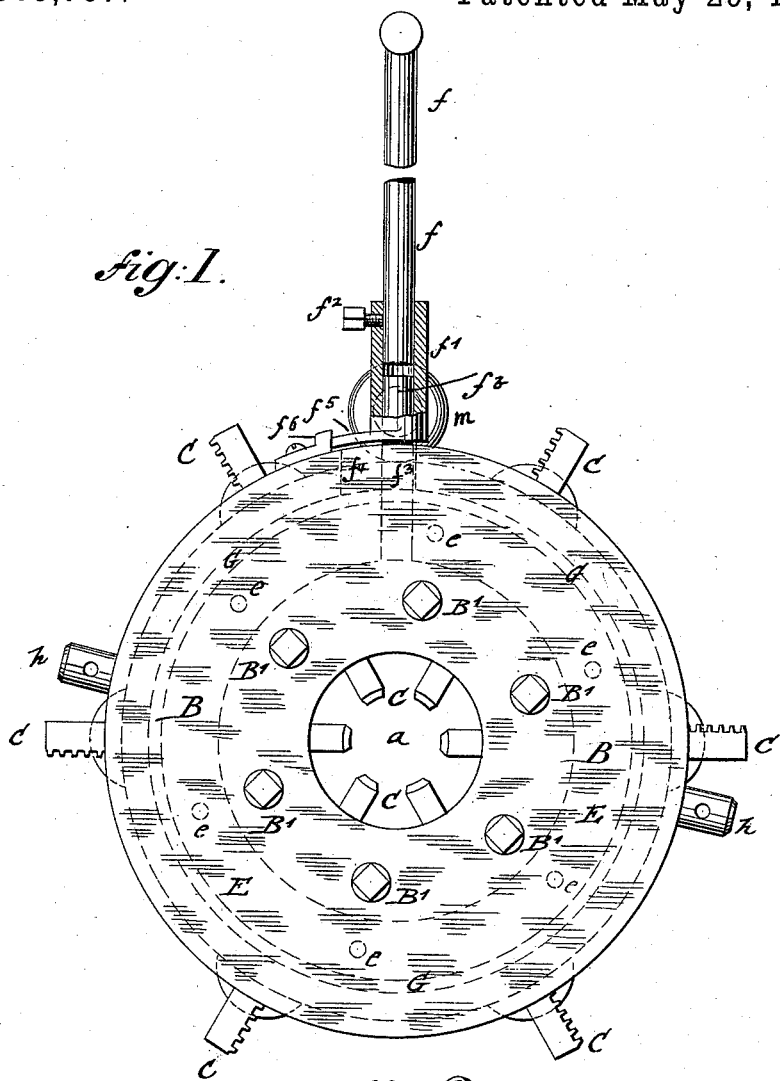

(No Model.) 3 Sheets—Sheet 1.

F. VIRGIEN.
PIPE THREADING DIE.

No. 383,787. Patented May 29, 1888.

WITNESSES:
A. Schehl.
Carl Kern.

INVENTOR.
Friedrich Virgien,
BY Goepel & Raegener
ATTORNEYS.

(No Model.) 3 Sheets—Sheet 2.

F. VIRGIEN.
PIPE THREADING DIE.

No. 383,787. Patented May 29, 1888.

WITNESSES:
A. Schehl.
Carl Kash.

INVENTOR.
Friedrich Virgien,
BY Goepel & Raegener
ATTORNEYS.

(No Model.) 3 Sheets—Sheet 3.

F. VIRGIEN.
PIPE THREADING DIE.

No. 383,787. Patented May 29, 1888.

WITNESSES:
A. Schehl.
Carl Kay

INVENTOR.
Friedrich Virgien.
BY
Goepel & Raegener
ATTORNEYS.

N. PETERS, Photo-Lithographer, Washington, D. C.

UNITED STATES PATENT OFFICE.

FRIEDRICH VIRGIEN, OF YONKERS, NEW YORK.

PIPE-THREADING DIE.

SPECIFICATION forming part of Letters Patent No. 383,787, dated May 29, 1888.

Application filed February 15, 1888. Serial No. 264,072. (No model.)

*To all whom it may concern:*

Be it known that I, FRIEDRICH VIRGIEN, of Yonkers, in the county of Westchester and State of New York, have invented certain new and useful Improvements in Cutter-Dies for Pipe-Threading Machines, of which the following is a specification.

This invention relates to an improved cutter-die for pipe-threading machines, said cutter-die being provided with cutters of any length, which can be readily removed and replaced from the block without opening the same, whenever required for resharpening the same, and in which the cutters are rigidly locked in position, readily adjusted to the size of the pipe to be threaded, and quickly expanded after the threading operation, so as to remove the pipe from the die.

The invention consists of a cutter-die for threading pipes of different sizes, which comprises radial cutters that extend toward the inside and outside of the block, said cutters being toothed at one side and locked in position for cutting in the block by means of toothed jaws that are adapted to swing on fixed pivots of the block. The jaws are engaged by pins of a slide-ring located in the cap or cover of the block, said pins engaging recesses of the cutter-holding jaws. When the cutters have been adjusted to the proper size of pipe, the adjusting-ring is locked in position by a suitable locking device, so as to prevent the shifting of the cutters and their locking-jaws. The slide-ring of the cap serves also for expanding the cutters for removing the pipe after threading. A second slide-ring is guided in a groove of the main part of the block and provided with curved and pointed fingers that are loosely set into eyes or recesses of the ring and adapted to move along recesses of the block, so as to push the cutter-holding jaws and the cutters slightly inward for the more accurate cutting of the thread. The adjustment of the slide-ring is produced by radial lugs which extend through slots of the block.

The invention consists, further, of certain details of construction and combination of parts, which will be fully described hereinafter, and finally pointed out in the claims.

Figure 2:
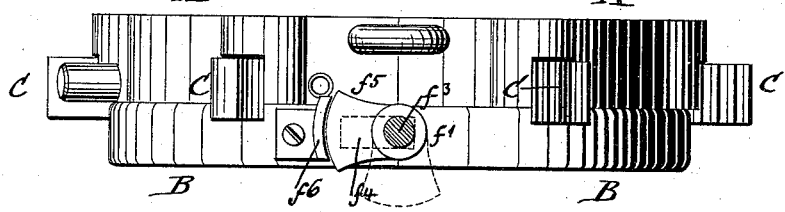
Figure 5:
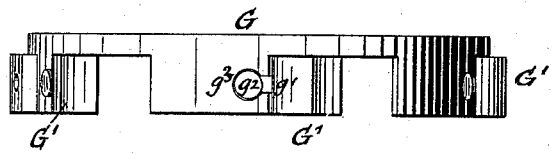
Figure 3:
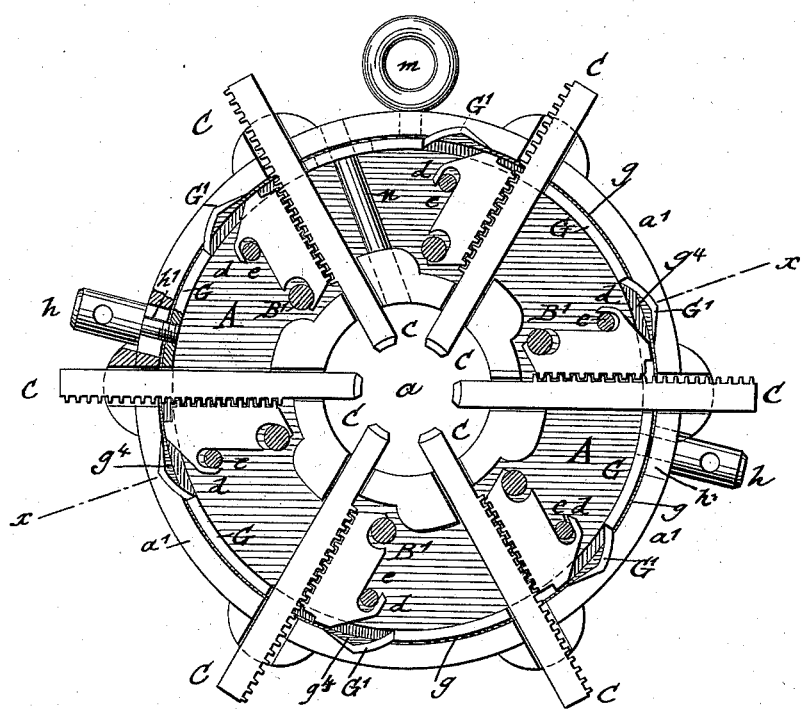
Figure 4:
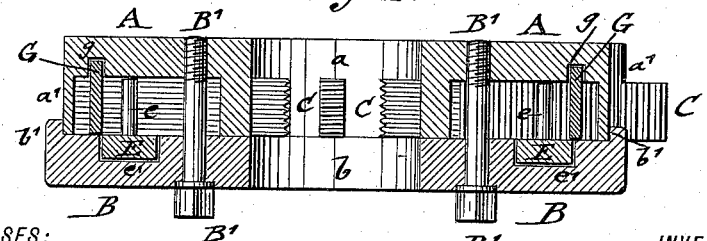
Figure 6:
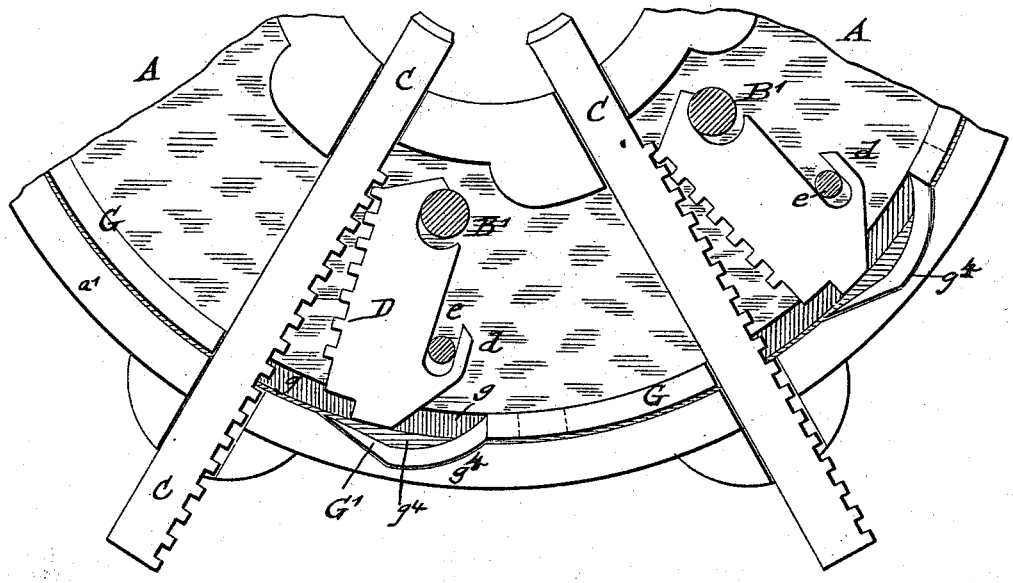

In the accompanying drawings, Figure 1 represents a front elevation, partly in section, of my improved cutter-die for pipe-threading machines. Fig. 2 is a plan view of Fig. 1, also partly in section. Fig. 3 is a sectional elevation of the cutter-die with the cap or cover removed, so as to show the interior of the same. Fig. 4 is a cross-section on line $x\ x$, Fig. 3. Fig. 5 is a side elevation of the slide-ring for producing the slight inward adjustment of the cutters and their locking-jaws. Fig. 6 is a detail side view of two cutters, their locking-jaws and their adjusting slide-ring, drawn on a larger scale; and Fig. 7, a similar side view showing two reversible cutters and devices for guiding the same.

Similar letters of reference indicate corresponding parts.

Referring to the drawings, A represents the main part of the case, or so-called "block," of my improved cutter-die for pipe-threading machines, which main part has a central opening, $a$. B represents the cap or cover of the same, which is provided with a central opening, $b$, of the same size as the opening $a$ of the main part A, and with an exterior flange, $b'$, that overlaps the outer flange, $a'$, of the main part A, as shown in Fig. 4.

The inner and outer flanges of the main part A, as well as the outer flanges, $b'$, of the cap B are radially recessed for guiding a number of cutters, C, as shown clearly in Fig. 3. The cutters C extend inwardly into the center opening of the block and to the outside of the same, they being made of any suitable length, so that they can be used for a considerable length of time. The cutters C are toothed or rack-shaped at one side, and are engaged by toothed locking-jaws D, which are recessed at that end nearer to the center of the block, so as to be engaged by or pivoted to the smooth shanks of the screw-bolts B', by which the cap is attached to the block A. The teeth of the locking-jaws D are made square, with the exception of the innermost teeth, which are rounded off and adapted to oscillate in the intermeshing recesses of the cutters, so as to produce the expanding of the same by oscillating the jaws after the threading action is completed. The locking-jaws D are further provided at their outer ends with hooks or eyes $d$, which are engaged by pins $e$ of a slide-ring, E, that is guided in a circular groove, e', of the cap B. By shifting the slide-ring E in its guide-groove the locking-jaws D are oscillated on the shanks of the screw-bolts B', which serve as pivots and are either applied to the cutters C, so that the teeth of the jaws engage the rack-shaped sides of the cutters and hold the latter rigidly in position, or moved away from the cutters, so that the latter are withdrawn in outward direction and "expanded" for permitting the withdrawal of the threaded pipe.

Shifting motion is imparted to the slide-ring E by a handle, $f$, that is secured by a coupling-sleeve, $f'$, and set-screw $f^2$ to a radial pin or lug, $f^3$, of the slide-ring E, said pin being guided in a slot, $f^4$, of the cap B, as shown in Figs. 1 and 2. The sleeve $f'$ is further provided with an arc-shaped lug, $f^5$, which abuts against an arc-shaped stop, $f^6$, attached to the outer circumference of the cap B, as shown in Figs. 1 and 2. When turning the handle $f$ in one direction, the lug $f^5$ is released from the stop $f^6$, as shown in dotted lines in Fig. 2, in which position a side motion imparted to the handle $f$ toward the right hand produces the shifting of the slide-ring E, and consequently the withdrawing of the jaws D from the teeth of the cutters C, as shown in Fig. 6. By moving the handle in the opposite direction the slide-ring E is also shifted in the opposite direction and the locking-jaws D moved into engagement with the rack-shaped sides of the cutters C. The handle $f$ is then turned on its axis and the lug $f^5$ placed against the stop $f^6$, so as to lock thereby the slide-ring, as well as the locking-jaws and the cutters, rigidly in position, so that the threading action on the pipe can be performed.

Figure 7:
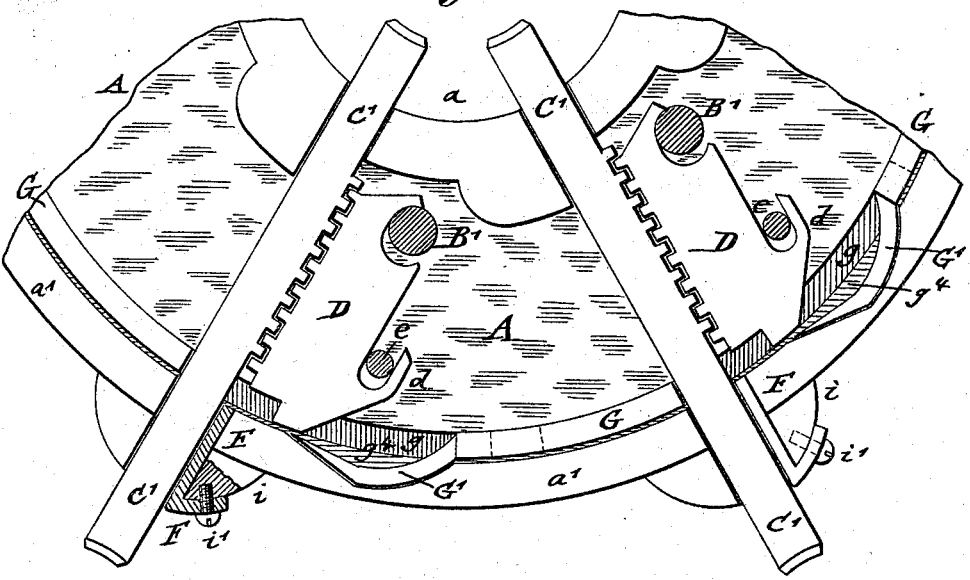

For the purpose of producing in some cases a more accurate adjustment of the cutters—as, for instance, when a slightly-increased depth of thread is to be imparted, or for producing the exact depth of thread for a given size of pipe—a second slide-ring, G, is guided in a circular groove, $g$, of the main part A of the block, said ring being located parallel to the outer flange, $a'$, of the main part A and close to the outer ends of the jaws D, as shown in Figs. 3 and 4. The slide-ring G is provided with as many recesses as there are cutters, and with curved and tapering fingers G', that are set by narrow shanks $g'$, having enlarged ends $g^2$, into eyes or openings $g^3$ of the solid portion of the ring G, as shown in Fig. 5. By this connection of the fingers G' with the slide-ring G the former can readily swing in the slide-ring, as if they were pivoted thereto. The fingers G' are set into corresponding recesses $g^4$ of the exterior flange of the main part A, as shown in Figs. 3, 6, and 7, so as to be guided along the inclined faces of said recesses toward the outer ends of the locking-jaws D, so that the tapering ends of the fingers G' are introduced between said outer ends and the inner faces of the recesses $g^4$ of the flange $a'$, and thereby the jaws D, as well as the cutters C, moved inwardly to a greater or smaller extent as far as the recessed inner ends of the jaws D will permit.

The slide-ring G is provided at diametrical points with radial lugs $h$, the shanks of which extend through slots $h'$ to the outside of the block A, the slots $h'$ limiting the extent of the shifting motion that may be imparted to the slide-ring G. By taking hold of the outer ends of the lugs and shifting the slide-ring G to the proper extent the fingers G' are forced in between the jaws D and the flange $d'$ of the block A, and the jaws and cutters move inwardly according to the extent of shifting motion imparted to the slide-ring G, so as to produce thereby the more accurate adjustment of the cutters than can be obtained by the slide-ring E of the cap B. The tapering fingers permit thereby a very nice and accurate adjustment of the cutters to the pipe to be threaded and the cutting of the exact depth of thread.

When it is desired to expand the cutters for removing the pipe from the die, the fingers have to be first returned by shifting the slide-ring G to its former position, after which the jaws may be oscillated and the cutters withdrawn by the slide-ring E. By withdrawing one of the fastening bolts B' after the other, one at a time, one locking-jaw D after the other can be moved away from the rack of the cutter, so as to clear the same entirely and permit one cutter after the other to be readily removed from the block in radial direction for resharpening, or replaced in the same without removing the cap from the same. This is an essential feature of my improved cutter-die, and one which is not found in the cutter-dies heretofore in use, which latter require the removing of the cap for removing the cutters. It also has the advantage of permitting the use of much longer cutters, which can be sharpened as often as they are worn off by use, and which last much longer thereby than the shorter cutters in use in cutter-dies of known constructions. My improved cutter-die can also be furnished with reversible cutters, which are provided at both ends with threading-bits, as shown in Fig. 7. In that case the toothed or rack-shaped portion is only arranged at the middle part of the cutter C, while the end portions of the same are smooth at both sides. To properly guide the reversible cutters C', it is necessary to introduce in the outer guide-recesses of the flange $a'$ at one side of the cutters C' filling-pieces F, which are attached to outwardly-extending projections $i$ of the main part A by fastening-screws $i'$, as shown in Fig. 7. By using reversible cutters and filling-pieces the cutters can be used until they are worn off at both ends before requiring the resharpening of the cutting-bits.

The block A B is further provided with a fixed eye, $m$, at its upper part for suspending the cutter-die on the hoisting device when removing it from the machine or replacing it in the same, and with a lubricating-channel, $n$, as customary in cutter-dies of this class.

My improved cutter for pipe-threading machines combines a number of advantages—first, the use of cutters of greater length; secondly, the quick and convenient removal and replacing of the cutters from the block without removing the cap of the same; thirdly, the facility by which the cutters are expanded, so as to remove the threaded pipe; fourthly, the reliable locking of the cutters by the jaws, and, lastly, the accurate adjustment of the cutters by means of the shifting slide-ring and fingers of the block.

Having thus described my invention, I claim as new and desire to secure by Letters Patent—

1. The combination, with the block of a cutter-die, of radially-guided cutters having teeth or racks at one side, pivoted locking-jaws having toothed faces, a slide-ring provided with pins for engaging said jaws, and means for shifting the slide-ring, substantially as set forth.

2. The combination of a block having radially-aligned recesses at the inner and outer ends, radial cutters guided in said recesses and provided with teeth or racks at one side, pivoted locking-jaws having toothed faces meshing with said racks, an interior slide-ring guided in a groove of the cap and provided with pins for engaging the jaws, means for shifting said slide-ring, and means for locking it into position when shifted, substantially as set forth.

3. The combination of the main part and caps of the block, screw-bolts for connecting the same, radially-guided cutters having teeth or racks at one side, toothed locking-jaws pivoted to said bolts, and a slide-ring guided in a groove of the cap and provided with pins for engaging the jaws, so as to set the cutters in locked position or expand the same, substantially as set forth.

4. The combination of the block of a cutter-die, radially-guided cutters having teeth or racks, pivoted locking-jaws having toothed faces meshing with said racks, a recessed slide-ring guided in the block and encircling the jaws, and tapering fingers pivoted to said slide-ring and adapted to engage the locking-jaws, so as to adjust the same and the cutters, substantially as set forth.

5. The combination of the block of a cutter-die, radially-guided cutters having teeth or racks at one side, pivoted locking-jaws having toothed faces, a slide-ring having pins for engaging said jaws and setting the same, and an encircling slide-ring having pivoted and tapering fingers for adjusting the jaws and cutters after they are set, substantially as set forth.

6. The combination of the block of a cutter-die, radially-guided cutters having teeth or racks, pivoted locking-jaws having toothed faces intermeshing with said racks, recesses at the inner ends and hooks at the outer ends, a slide-ring having pins for engaging the hooks of the jaws, a second slide-ring extending around the jaws, and tapering fingers pivoted to the jaws and guided along inclined recesses of the circumference of the block, substantially as set forth.

7. The combination of the block of a cutter-die, radially-guided cutters having teeth or racks at one side, pivoted locking-jaws having toothed faces intermeshing with the toothed cutters, a slide-ring extending around the jaws, tapering fingers pivoted to the slide-ring and guided along inclined recesses of the outer flange of the block, and radial lugs attached to the slide-ring and extended to the outside of the block for setting the slide-ring, substantially as set forth.

8. The combination of the block of a cutter-die, radial cutters guided by the same, said cutters having toothed middle portions and smooth ends, pivoted locking-jaws having toothed faces for locking said cutters, and filling-pieces set into the guide-recesses at the outer flange of the block, substantially as set forth.

In testimony that I claim the foregoing as my invention I have signed my name in presence of two subscribing witnesses.

FRIEDRICH VIRGIEN.

Witnesses:
 JOHN A. STRALEY,
 SIDNEY MANN.